United States Patent [19]
Wideman et al.

[11] Patent Number: 5,900,448
[45] Date of Patent: May 4, 1999

[54] RUBBER COMPOSITION CONTAINING HYDRATED ZINC-SODIUM THIOSULFATE

[75] Inventors: Lawson Gibson Wideman, Tallmadge; William Paul Francik, Bath; Richard Michael D'Sidocky, Ravenna, all of Ohio

[73] Assignee: The Goodyear Tire & Rubber Company, Akron, Ohio

[21] Appl. No.: 09/016,582

[22] Filed: Jan. 30, 1998

[51] Int. Cl.⁶ ........................................ C08K 3/00
[52] U.S. Cl. ............................................ 524/419; 524/418
[58] Field of Search ..................................... 524/419, 418

[56] References Cited

U.S. PATENT DOCUMENTS 5,594,052  1/1997  D'Sidocky ............................... 524/83

*Primary Examiner*—Edward J. Cain
*Attorney, Agent, or Firm*—Bruce J Hendricks

[57] ABSTRACT

A method for processing an elastomer comprising mixing 100 parts by weight of an elastomer having olefinic unsaturation with from 0.05 to 10 phr of a hydrated zinc-sodium thiosulfate. The hydrated zinc-sodium thiosulfate may be used in place of in whole or in part for conventional adhesion promoting cobalt compounds.

16 Claims, No Drawings

RUBBER COMPOSITION CONTAINING HYDRATED ZINC-SODIUM THIOSULFATE

FIELD OF THE INVENTION

The present invention relates to improving the properties of a rubber composition, particularly suited for wire coat or ply coat compounds.

BACKGROUND OF THE INVENTION

U.S. Pat. No. 5,594,052 discloses a method for increasing the rate of vulcanization of a sulfur vulcanizable rubber by using a hydrated thiosulfate. Specific examples of hydrated thiosulfates include $BaS_2O_3 \cdot H_2O$, $K_2S_2O_3 \cdot 1.5 H_2O$, $CaS_2O_3 \cdot 6H_2O$, $MgS_2O_3 \cdot 6H_2O$, $NiS_2O_3 \cdot 6H_2O$, $CoS_2O_3 \cdot 6H_2O$, $SrS_2O_3 \cdot 5H_2O$, $Na_2S_2O_3 \cdot 5H_2O$, $MnS_2O_3 \cdot 5H_2O$, $Li_2S_2O_3 \cdot 3H_2O$ and $CdS_2O_3 \cdot 2H_2O$.

EP 765903-A2 discloses an adherent rubber composition for steel cord containing 0.1 to 10 parts by weight of an inorganic salt hydrate. Representative examples of inorganic salt hydrates include $NiSO_4 \cdot 7H_2O$, $CoSO_4 \cdot 7H_2O$, $CaSO_4 \cdot 2H_2O$, $ZnSO_4 \cdot 7H_2O$, $MgSO_4 \cdot 7H_2O$ and $Na_2S \cdot 9H_2O$.

SUMMARY OF THE INVENTION

The present invention relates to the use of hydrated zinc-sodium thiosulfate in a rubber composition.

DETAILED DESCRIPTION OF THE INVENTION

There is disclosed a method for processing an elastomer comprising mixing 100 parts by weight of an elastomer having olefinic unsaturation with from 0.05 to 10 phr of a hydrated zinc-sodium thiosulfate.

There is also disclosed a rubber composition comprising (a) an elastomer containing olefinic unsaturation; and (b) from 0.05 to 10 phr of a hydrated zinc-sodium thiosulfate.

The present invention may be used in sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers.

In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), styrene-butadiene copolymers, polyisoprene (including cis-1,4-polyisoprene), butyl rubber, styrene-isoprene copolymers, styrene-isoprene-butadiene terpolymers, methyl methacrylate-butadiene copolymers, methyl methacrylate-isoprene copolymers, as well as ethylene/propylene terpolymers, also known as ethylene/propylene/diene monomer (EPDM), and in particular, ethylene/propylene/dicyclopentadiene terpolymers. Mixtures of the above rubber may be used. The preferred rubber or elastomers are styrene/butadiene copolymer, polybutadiene, natural rubber and polyisoprene.

The term "phr" as used herein, and according to conventional practice, refers to "parts by weight of a respective material per 100 parts by weight of rubber, or elastomer".

The first essential component of the present invention is the hydrated zinc-sodium thiosulfate. The hydrated zinc-sodium thiosulfate used in the present invention may be added to the rubber by any conventional technique such as on a mill or in a Banbury. The amount of hydrated thiosulfate may vary widely depending on the type of rubber and other compounds present in the vulcanizable composition. Generally, the amount of hydrated zinc-sodium thiosulfate is used in a range of from about 0.05 to about 10.0 phr with a range of 0.1 to about 5.0 phr being preferred.

For ease in handling, the hydrated zinc-sodium thiosulfate may be used per se or may be deposited on suitable carriers. Examples of carriers which may be used in the present invention include silica, carbon black, alumina, kieselguhr, silica gel and calcium silicate.

The hydrated zinc-sodium thiosulfate may be prepared by reacting sodium thiosulfate pentahydrate with zinc chloride. Such reaction is preferably conducted in an aqueous or alcohol solution.

The reaction between the sodium thiosulfate pentahydrate and zinc chloride may be conducted over a wide temperature range. The temperature may range from about 5° C. to 100° C. The preferred temperature range is from about 20° C. to 75° C.

The reaction pressure to form the hydrated zinc-sodium thiosulfate is not deemed to be critical. Pressures ranging from 0 kPa to 689 kPa may be used.

The rubber of the present invention is vulcanized in the presence of a sulfur vulcanizing agent. Examples of suitable sulfur vulcanizing agents include elemental sulfur (free sulfur), an amine disulfide, polymeric polysulfide or sulfur olefin adducts. Preferably, the sulfur vulcanizing agent is elemental sulfur. The sulfur vulcanizing agent may be used in an amount ranging from 0.5 to 8 phr, with a range of from 1.5 to 5.0 being preferred.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as activators and retarders and processing additives, such as oils, resins including tackifying resins and plasticizers, fillers, pigments, fatty acid, zinc oxide, waxes; antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, only a sulfenamide accelerator may be used, i.e., primary accelerator. Representative of the sulfenamide compounds which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide and N-t-butylbis-(2-benzothiazylsulfen)amide. Preferably, the sulfenamide compound is N-cyclohexyl-2-benzothiazylsulfenamide. In another embodiment, combinations of a sulfenamide and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators other than the sulfenamides that may be used in the present invention are amines, disulfides, guanidines, thioureas, thiazoles, thiurams, dithiocarbamates and xanthates. If a second accelerator is used, the secondary accelerator is preferably a guanidine, dithiocarbamate or thiuram compound.

The rubber compositions of the present invention may contain sulfur containing organosilicon compounds.

Examples of suitable sulfur containing organosilicon compounds are of the formula:

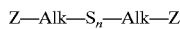

in which Z is selected from the group consisting of

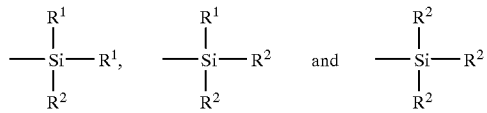

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis (triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxysilylpropyltetrasulfide, 2,2'-bis (dimethyl methoxysilylethyl) disulfide, 2,2'-bis(dimethyl sec.butoxysilylethyl) trisulfide, 3,3,-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore as to formula I, preferably Z is

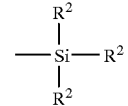

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound in a rubber composition will vary depending on the level of silica that is used. Generally speaking, the amount will range from 0.5 to 50 phr. Preferably, the amount will range from 1.5 to 8 phr. Depending on the desired properties, the weight ratio of the sulfur containing organosilicon compound to silica may vary. Generally speaking, the weight ratio will range from 1:100 to 1:5. Preferably, the weight ratio will range from 1:20 to 1:10.

When the sulfur containing organosilicon is present, the rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as hereinbefore referenced, may be as low as about 30 phr, but is preferably from about 45 to about 90 phr. It is to be appreciated that the sulfur containing organosilicon may be used in conjunction with a carbon black, namely pre-mixed with a carbon black prior to addition to the rubber composition, and such carbon black is to be included in the aforesaid amount of carbon black for the rubber composition formulation. The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

In order to cure a rubber composition, a sulfur vulcanizing agent is dispersed throughout the composition. The sulfur vulcanizing agent may be used in an amount ranging from 0.5 phr to 6.0 phr, with a range of from 1.0 to 4.0 phr being preferred. Representative examples of sulfur vulcanizing agents include elemental sulfur ($S_8$), an amine disulfide, polymeric polysulfide and sulfur olefin adducts. Preferably, the sulfur vulcanizing agent is elemental sulfur.

The commonly employed carbon blacks used in conventional rubber compounding applications can be used as the carbon black in this invention. Representative examples of such carbon blacks include N110, N121, N220, N231, N234, N242, N293, N299, S315, N326, N330, M332, N339, N343, N347, N351, N358 and N375. These carbon blacks have iodine absorptions ranging from 68 to 145 g/kg and DBP No. ranging from 72 to 130 $cm^3$/100 g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants, retarders, and peptizing agents. As known to those skilled in the art, the additives mentioned above are selected and commonly used in conventional amounts for tire tread applications. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of retarders range from 0.05 to 2 phr. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

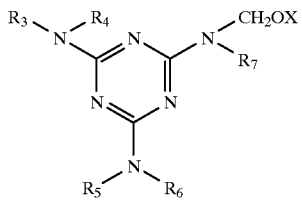

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N',N"-tributyl-N,N',N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

When the compound of the present invention is used as a wire coat or bead coat for use in a tire, the hydrated zinc-sodium thiosulfate may be used in whole or as a partial replacement for an organo-cobalt compound which serves as a wire adhesion promoter. When used in part, any of the organo-cobalt compounds known in the art to promote the adhesion of rubber to metal may be used. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc, Trenton, New Jersey. Manobond C is believed to have the structure:

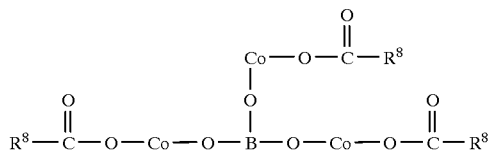

in which $R^8$ is an alkyl group having from 9 to 12 carbon atoms.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished stock composition. Accordingly, it may in general be stated that the amount of organo-cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica and sulfur containing organosilicon, and carbon black if used, may be mixed in one or more non-productive mix stages. The terms "non-productive" and "productive" mix stages are well known to those having skill in the rubber mixing art.

In one aspect of the present invention, the rubber composition is sulfur-cured or vulcanized.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the rubber composition at a temperature ranging from 100° C. to 200° C., the rubber composition of this invention can be used for various purposes. For example, the sulfur vulcanized rubber composition may be in the form of a tire, belt, hose, motor mounts, gaskets and air springs. In the case of a tire, it can be used for various tire components. Such tires can be built, shaped, molded and cured by various methods which are known and will be readily apparent to those having skill in such art. When the rubber composition is used in a tire, its use may be in a wire coat, bead coat, tread, apex, sidewall and combination thereof. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected.

Strebler adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

Wire adhesion was determined using the SWAT method (R Ridhor et al, "Stress Analysis of Cord Adhesion Test—A Route to Approved Tests," Rubber Chemistry Tech, Vol 54, page 835 [1981]).

EXAMPLE 1

Preparation of Hydrated Zinc-Sodium Thiosulfate

A 2-liter round-bottom flask was charged 74.4 g (0.3 mole) of powdered sodium thiosulfate pentahydrate, 1-liter of 95 percent ethanol and 20.4 g (0.15 mole) of zinc chloride. The reaction was stirred at room temperature under nitrogen where a mild exotherm of about 3° C. was observed. The mixture was stirred for 11 hours, wherein a fluffy white precipitate formed, suction filtered and air-dried to give 61.4 g white solid showing 29.9 percent sulfur and 8.3 percent zinc. The sample also contains sodium and waters of hydration.

EXAMPLE 2

The formulations set out in Table 1 below were used for the samples. Other than the ingredients set out in Table 1, each sample contained the same conventional amount of processing oil, stearic acid, zinc oxide, antioxidant, sulfur and accelerator. The various ingredients were compounded using conventional rubber compounding techniques and the samples vulcanized by compression molding methods for 24 minutes at 150° C. unless otherwise stated.

TABLE 1

| Sample No. | 1 | 2 | 3 | 4 | 5 | 6 | 7 |
|---|---|---|---|---|---|---|---|
| Non-Productive | | | | | | | |
| SBR[1] | 68.75 | 68.75 | 68.75 | 68.75 | 68.75 | 68.75 | 68.75 |
| Polyisoprene[2] | 50 | 50 | 50 | 50 | 50 | 50 | 50 |
| Carbon Black[3] | 50 | 50 | 50 | 50 | 50 | 50 | 50 |
| $NaS_2O_3 \cdot 5H_2O$ | 0.5 | 0 | 0 | 0 | 0 | 0 | 0 |
| Hydrate of Ex. 1 | 0 | 0 | 0 | 0.5 | 0 | 0 | 0 |
| Productive | | | | | | | |
| $NaS_2O_3 \cdot 5H_2O$ | 0 | 0.25 | 0.5 | 0 | 0 | 0 | 0 |
| Hydrate of Ex. 1 | 0 | 0 | 0 | 0 | 0.25 | 0.5 | 0 |

[1]Emulsion polymerized styrene-butadiene rubber containing 50 parts SBR and 18.75 oil and commercially available from The Goodyear Tire & Rubber Company under the designation SBR 1712C.
[2]Commercially available from The Goodyear Tire & Rubber Company under the designation Natsyn ® 2200.
[3]N299

Table 2 below lists the data for the physical properties of the above samples.

TABLE 2

| Sample No. | 1 | 2 | 3 | 4 | 5 | 6 | 7 |
|---|---|---|---|---|---|---|---|
| $NaS_2O_3 \cdot 5H_2O$ - NP | 0.5 | 0 | 0 | 0 | 0 | 0 | 0 |
| Hydrate of Ex 1 - NP | 0 | 0 | 0 | 0.5 | 0 | 0 | 0 |
| $NaS_2O_3 \cdot 5H_2O$ - Prod | 0 | 0.25 | 0.5 | 0 | 0 | 0 | 0 |
| Hydrate of Ex 1 - Prod | 0 | 0 | 0 | 0 | 0.25 | 0.5 | 0 |
| Monsanto Rheometer 1° Arc, 150° C. | | | | | | | |
| $T_1$ (min) | 8.5 | 7.4 | 6.1 | 10.4 | 10.8 | 10.6 | 10.4 |
| $T_{25}$ (min) | 11.4 | 9.8 | 7.8 | 13.7 | 14.2 | 14.1 | 13.7 |
| $T_{50}$ (min) | 13 | 11.4 | 9.3 | 15.3 | 15.9 | 15.7 | 15.3 |
| $T_{75}$ (min) | 15.6 | 14.2 | 12 | 17.9 | 18.5 | 18.4 | 18 |
| $T_{90}$ (min) | 19.4 | 18.1 | 15.9 | 21.8 | 22.3 | 22.2 | 21.7 |
| Min Torque (dNm) | 7.5 | 7.1 | 7 | 6.8 | 6.8 | 6.7 | 7.1 |
| Max Torque (dNm) | 31.6 | 30.9 | 30.9 | 31.3 | 31.3 | 31.3 | 31.4 |
| Delta Torque (dNm) | 24.1 | 23.8 | 23.9 | 24.5 | 24.5 | 24.6 | 24.3 |
| Final Torque (dNm) | 31.2 | 30.6 | 30.6 | 31.1 | 31.1 | 31.1 | 31.2 |
| Rate (dNm/min) | 1.98 | 1.9 | 1.95 | 1.99 | 2.01 | 2.01 | 2.01 |
| Mooney Scorch @ 121° C. | | | | | | | |
| 5 pt rise | 51 | 44.9 | 35.3 | 69.4 | 72.3 | 71 | 68 |
| Stress-Strain Data | | | | | | | |
| Modulus, 100% (MPa) | 1.62 | 1.58 | 1.56 | 1.62 | 1.63 | 1.62 | 1.62 |
| Modulus, 150% (MPa) | 2.63 | 2.52 | 2.5 | 2.57 | 2.56 | 2.57 | 2.58 |
| Modulus, 200% (MPa) | 4.09 | 3.88 | 3.87 | 3.95 | 3.92 | 3.96 | 3.96 |
| Modulus, 300% (MPa) | 7.85 | 7.43 | 7.46 | 7.55 | 7.55 | 7.56 | 7.51 |
| Break Strength (MPa) | 18.72 | 19.34 | 20.21 | 18.16 | 18.95 | 16.64 | 20.21 |
| Elongation @ Break (%) | 582 | 620 | 630 | 583 | 606 | 550 | 636 |
| Hardness, RT | 55.1 | 54.4 | 54.6 | 55.1 | 55 | 55.5 | 54.7 |
| Hardness, 100° C. | 49 | 48 | 48.1 | 48.7 | 48.5 | 48.9 | 48.4 |
| Rebound, RT (%) | 44.8 | 43.9 | 43.7 | 44.1 | 44.4 | 43.8 | 44.4 |
| Rebound, 100° C. (%) | 61.2 | 59.6 | 60.2 | 60 | 59.6 | 59.4 | 60.8 |

Table 2 of Example 2 is intended to illustrate the cure time and scorch time differences between sodium thiosulfate pentahydrate and the hydrate of Example 1. Sample 7 represents a control compound in which no hydrated salts are present while Sample 1 represents the case where sodium thiosulfate pentahydrate was added to the non-productive mix stage while Sample 4 represents the case where the hydrate of Example 1 was added to the non-productive mix stage. In comparing the effects on cure times and scorch times, it can be seen that sodium thiosulfate pentahydrate reduces cure time from 21.7 minutes (Sample 7) to 19.4 minutes (Sample 1) and scorch time from 68 minutes to 51 minutes. No such reductions were seen with the hydrate of Example 1. Note that T90 cure time and scorch time for the hydrate of Example 1 was 21.8 minutes and 69.4 minutes, respectively. This illustrates the cure and scorch advantage the hydrate salt of Example 1 offers over sodium thiosulfate pentahydrate. Likewise, in the cases where the hydrated salts are added to the productive stage, cure time reductions and scorch time reductions are seen with sodium thiosulfate pentahydrate but not with the hydrate of Example 1. Thus, Sample 7 containing no hydrated salts gave a T90 cure time of 21.7 minutes and a scorch time of 68 minutes. The addition of 0.25 phr and 0.50 phr of sodium thiosulfate pentahydrate to the productive stage reduced T90 cure time to 18.1 and 15.9 minutes, respectively, and scorch times to 44.9 minutes and 35.3 minutes, respectively. Addition of the hydrate of Example 1 had no effect on cure time and scorch time. The addition of 0.25 phr and 0.50 phr of the hydrate of Example 1 gave T90 cure times of 22.3 minutes and 22.2 minutes, respectively, and scorch times of 72.3 minutes and 71 minutes, respectively. Again, this illustrates the cure and scorch advantage the hydrate salt of Example 1 offers over sodium thiosulfate pentahydrate.

EXAMPLE 3

The formulations set out in Table 3 below were used for the samples. Other than the ingredients set out in Table 3, each sample contained the same conventional amount of zinc oxide, processing oil, antiozonant, stearic acid, resorcinol, accelerator, antioxidant, sulfur, retarder and hexamethoxymelamine.

TABLE 3

| Sample No. | 8 | 9 | 10 |
|---|---|---|---|
| Non-Productive | | | |
| Polyisoprene[1] | 100 | 100 | 100 |
| Carbon Black[2] | 60 | 60 | 60 |
| Productive | | | |
| $NaS_2O_3 \cdot 5H_2O$ | 0 | .50 | 0 |
| Hydrate of Ex. 1 | 0 | 0 | .50 |
| Cobalt Neodecanoate | 1.35 | .68 | .68 |

[1]Commercially available for The Goodyear Tire & Rubber Company under the designation Natsyn ® 2200.
[2]N326

TABLE 4

| Sample No. | 8 | 9 | 10 |
|---|---|---|---|
| Cobalt Neodecanoate | 1.35 | 0.68 | 0.68 |
| $NaS_2O_3 \cdot 5H_2O$ - Prod | 0 | 0.50 | 0 |
| Hydrate of Ex 1 - Prod | 0 | 0 | 0.50 |

TABLE 4-continued

| Sample No. | 8 | 9 | 10 |
|---|---|---|---|
| Monsanto Rheometer 1° Arc, 150° C. | | | |
| $T_{25}$ (min) | 1.5 | 1.5 | 1.7 |
| $T_{90}$ (min) | 3.8 | 4.1 | 4.4 |
| Min Torque (dNm) | 3.7 | 3.4 | 3.5 |
| Max Torque (dNm) | 38 | 38.5 | 37.9 |
| Delta Torque (dNm) | 24.1 | 23.8 | 23.9 |
| Final Torque (dNm) | 31.2 | 30.6 | 30.6 |
| Rate (dNm/min) | 1.98 | 1.9 | 1.95 |
| Mooney Scorch @ 120° C. 5 pt rise (min) | 39.4 | 23 | 38 |
| Modulus, 300% (MPa) | 11.5 | 11.4 | 11.9 |
| Break Strength (MPa) | 17.2 | 16.9 | 15.5 |
| Elongation @ Break (%) | 450 | 440 | 400 |
| Hardness, RT | 80.3 | 79 | 77.1 |
| Hardness, 100° C. | 74.5 | 73 | 72 |
| Rebound, RT (%) | 42.4 | 41.8 | 43.2 |
| Rebound, 100° C. (%) | 51.6 | 51 | 53.5 |
| SWAT Adhesion | | | |
| Room Temp (N) | 630 | 619 | 553 |
| Rubber Coverage (%) | 80 | 70 | 70 |
| Aged 5 days in $H_2O$ @ 90° C. (N) | 346 | 432 | 407 |
| Rubber coverage (%) | 10 | 30 | 30 |
| Aged 10 days in $H_2O$ @ 90°C. (N) | 203 | 281 | 273 |
| Rubber Coverage (%) | 0 | 0 | 0 |
| Strebler Adhesion 95° C. to Self (N) | 87 | 81 | 87 |

Table 4 lists the wire adhesion and scorch time differences between sodium thiosulfate pentahydrate (Sample 9) and the hydrate of Example 1 (Sample 10). Sample 8 represents a control compound in which no hydrated salts are present.

In comparing the effects on scorch times, it can be seen that the sodium thiosulfate pentahydrate reduces the scorch time from 39 minutes (Sample 8) to 23 minutes (Sample 9). No such reductions were seen with the hydrate of Example 1.

Note that the Sample 10 containing the hydrate of Example 1 was 38 minutes. This illustrates the scorch advantage the hydrate salt of Example 1 offers over sodium thiosulfate pentahydrate. One of the most important physical properties of the wire coat compound is wire adhesion. Table 4 illustrates the differences between sodium thiosulfate pentahydrate and the hydrate of Example 1. SWAT adhesion data was measured originally and after 5 and 10 days of water immersion at 90° C. SWAT adhesion measures the force in Newtons to pull the imbedded wire out of a cured rubber block and the percent of the wire covered with rubber (percent wire coverage is a subjective value). In comparing the effects on wire adhesion, it can be seen that there is no difference between sodium thiosulfate pentahydrate (Sample 9) and the hydrate of Example 1 (Sample 10). This is the case for both original and water-aged data. When comparing the wire adhesion data of sodium thiosulfate pentahydrate and the hydrate of Example 1 (Samples 9 and 10) with the control (Sample 8), there is no significant difference noted. This is the case for both original and water-aged SWAT testing.

What is claimed is:

1. A method for processing an elastomer comprising mixing 100 parts by weight of an elastomer having olefinic unsaturation with from 0.05 to 10 phr of a hydrated zinc-sodium thiosulfate.

2. The method of claim 1 wherein said hydrated zinc-sodium thiosulfate is present in an amount ranging from 0.10 to 5.0 phr.

3. The method of claim 1 wherein a sulfur vulcanizing agent is present in said elastomer and is selected from the group consisting of elemental sulfur, an amine disulfide, polymeric polysulfide and sulfur olefin adducts.

4. The method of claim 3 wherein said sulfur vulcanizing agent is present in an amount ranging from 0.5 to 8 phr.

5. The method of claim 1 wherein said elastomer containing olefinic unsaturation is selected from the group consisting of natural rubber, neoprene, polyisoprene, butyl rubber, polybutadiene, styrene-butadiene copolymer, styrene-isoprene copolymer, styrene-isoprene-butadiene terpolymer, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

6. A rubber composition comprising (a) an elastomer containing olefinic unsaturation; and (b) from 0.05 to 10 phr of a hydrated zinc-sodium thiosulfate.

7. The composition of claim 6 wherein said hydrated zinc-sodium thiosulfate is present in an amount ranging from 0.10 to 5.0 phr.

8. The composition of claim 6 wherein a sulfur vulcanizing agent is present in said rubber composition and is selected from the group consisting of elemental sulfur, an amine disulfide, polymeric polysulfide and sulfur olefin adducts.

9. The composition of claim 8 wherein said sulfur vulcanizing agent is present in an amount ranging from 0.5 to 8 phr.

10. The composition of claim 6 wherein said elastomer containing olefinic unsaturation and is selected from the group consisting of natural rubber, neoprene, polyisoprene, butyl rubber, polybutadiene, styrene-butadiene copolymer, styrene-isoprene copolymer, styrene-isoprene-butadiene terpolymer, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

11. A sulfur vulcanized rubber composition which is prepared by heating the rubber composition of claim 8 to a temperature ranging from 100° C. to 200° C.

12. The sulfur vulcanized rubber composition of claim 11 in the form of a tire, belt, hose, motor mounts, gaskets and air springs.

13. The sulfur-vulcanized rubber composition of claim 12 in the form of a tire.

14. The sulfur-vulcanized rubber composition of claim 13 wherein said composition is used in the wire coat, bead coat, tread, apex, sidewall and combinations thereof.

15. The sulfur-vulcanized rubber composition of claim 14 wherein said composition is used in the wire coat.

16. The sulfur-vulcanized rubber composition of claim 14 wherein said composition is used in the tread.

* * * * *